(12) United States Patent
Zhang et al.

(10) Patent No.: US 9,503,972 B2
(45) Date of Patent: *Nov. 22, 2016

(54) METHOD AND BASE STATION FOR ENERGY SAVING COMPENSATION

(71) Applicant: China Academy of Telecommunications Technology, Beijing (CN)

(72) Inventors: Dajun Zhang, Beijing (CN); Li Chen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 542 days.

This patent is subject to a terminal disclaimer.

(21) Appl. No.: 13/973,702

(22) Filed: Aug. 22, 2013

(65) Prior Publication Data

US 2014/0050135 A1 Feb. 20, 2014

Related U.S. Application Data

(63) Continuation of application No. 13/700,717, filed as application No. PCT/CN2011/078321 on Aug. 12, 2011, now Pat. No. 8,543,116.

(30) Foreign Application Priority Data

Aug. 13, 2010 (CN) .......................... 2010 1 0253982

(51) Int. Cl.
*H04W 36/00* (2009.01)
*H04W 52/02* (2009.01)
(Continued)

(52) U.S. Cl.
CPC ......... *H04W 52/0206* (2013.01); *H04W 24/02* (2013.01); *H04W 52/0219* (2013.01);
(Continued)

(58) Field of Classification Search
CPC ................ H04W 24/02; H04W 88/08; H04W 28/06; H04W 52/0219; H04W
(Continued)

(56) References Cited

U.S. PATENT DOCUMENTS

2010/0278038 A1* 11/2010 Stahle ................... H04W 24/04
370/216
2011/0044284 A1* 2/2011 Voltolina .............. H04W 24/02
370/331
(Continued)

FOREIGN PATENT DOCUMENTS

| CN | 101400125 A | 4/2009 |
| CN | 101742707 A | 6/2010 |

(Continued)

OTHER PUBLICATIONS

Alcatel-Lucent:, "Capacity and coverage SON use case", 3GPP Draft; R3-080082 Soncapa, 3$^{rd}$ Generation Partnership Project (3GPP), vol. RAN WG3, No. Sorrento Italy, Feb. 5, 2008.
(Continued)

*Primary Examiner* — Vladimir Magloire
*Assistant Examiner* — Jaime Holliday
(74) *Attorney, Agent, or Firm* — Foley & Lardner LLP; James F. Ewing; Paul M. H. Pua

(57) ABSTRACT

The present invention relates to the technical field of wireless communications, is used for optimizing an energy saving mechanism, and provides a method for energy saving compensation, which method comprises: expanding, by a base station, a signal coverage area to form a new cell, when the energy saving activation requirements are met, so as to allow an energy-saving cell managed by the base station to switch users to the new cell and to activate the energy saving state; and when energy saving deactivation requirements are met, and if the energy-saving cell managed by the base
(Continued)

station deactivates the energy saving state, then switching, by the base station, the users to the energy-saving cell and reducing the signal coverage area. The present invention optimizes currently available energy saving mechanisms and provides a solution capable of compensating the service loss of energy-saving cells.

16 Claims, 5 Drawing Sheets

(51) Int. Cl.
*H04W 24/02* (2009.01)
*H04W 52/36* (2009.01)
*H04W 28/06* (2009.01)
*H04W 72/04* (2009.01)
*H04W 88/08* (2009.01)

(52) U.S. Cl.
CPC ......... *H04W 52/0258* (2013.01); *H04W 28/06* (2013.01); *H04W 52/367* (2013.01); *H04W 72/0406* (2013.01); *H04W 88/08* (2013.01); *Y02B 60/50* (2013.01)

(58) Field of Classification Search
CPC ..................... 52/0258;H04W 52/367; H04W 72/0406
USPC ............. 455/422.1, 436, 438, 439, 446, 453
See application file for complete search history.

(56) References Cited

U.S. PATENT DOCUMENTS

2011/0244867 A1* 10/2011 Zhao ................ H04W 52/0235
455/438
2012/0063377 A1    3/2012  Osterling et al.

FOREIGN PATENT DOCUMENTS

| CN | 101778458 A | 7/2010 |
| CN | 101778459 A | 7/2010 |
| WO | WO 2009/078764 A1 | 6/2009 |
| WO | WO 2011/151684 A1 | 12/2011 |

OTHER PUBLICATIONS

EP Search Report from EP Application No. 11816114.0 dated Jul. 2, 2013.
Technical Report, "3$^{rd}$ generation partnership project: Technical specification group services and system aspects; Telecommunication management; Study on energy savings management (ESM) (Release 10)", 3GPP Standard, vol. 10, pp. 1-33, Mar. 30, 2010.
International Search Report for PCT/CN2011/078321—mailed Nov. 17, 2011.
Notice of Allowance for U.S. Appl. No. 13/700,717—mailed May 23, 2013.
Written Opinion of the International Searching Authority for PCT/CN2011/078321—mailed Nov. 17, 2011.

\* cited by examiner

METHOD AND BASE STATION FOR ENERGY SAVING COMPENSATION

This application is a continuation of U.S. patent application Ser. No. 13/700,717 which claims priority from Chinese Patent Application No. 201010253982.7 filed with the Chinese Patent Office on Aug. 13, 2010 and entitled "Method and Base Station for Energy Saving Compensation", the contents of which is herein incorporated by reference in its entirety.

FIELD OF THE INVENTION

The present invention relates to the technical field of wireless communications and particularly to a method and base station for energy saving compensation.

BACKGROUND OF THE INVENTION

Energy-saving technologies contribute to improving our environment, saving resources, and bringing cost benefit. At present the following approaches are available for energy saving of a mobile communication network: 1) the number of base station sites is optimized without influencing coverage, capacity and quality of service; 2) methods for effectively increasing utilization ratio of energy sources and reducing power consumption of devices are sought; and 3) sustainable energy resources, e.g., wind energy, solar energy, etc., are researched and developed.

For those energy-saving technologies in the approach 2), the concept of Energy Saving Management (ESM) has been proposed, where ESM refers to optimization of a resource utilization ratio of the entire network or a part thereof. ESM initiates appropriate actions through collecting and evaluating relevant information over the network to adjust network configuration, thereby satisfying service demands while saving the energy.

For a self-optimized network, an energy-saving entity can be roughly divided into the following three structures: distributed architecture, where a network element collects necessary information for a self-optimization process with no need for participation of Operation Administration and Maintenance (OAM); centralized architecture, where OAM collects information from a network element for triggering an energy-saving algorithm and then decides subsequent actions of the network element; and hybrid architecture, where both of the foregoing schemes are used in combination.

An energy-saving solution includes two basic processes:

1) Energy saving activation: a cell of an evolved Node B (eNB) is disabled or the use of a part of material resources is limited for the purpose of saving energy, and the corresponding eNB enters into an energy-saving state; and 2) Energy saving deactivation: the disabled cell is enabled or the limited use of material resources is resumed to thereby satisfy increased service demands and Quality of Service (QoS) demands, and the corresponding eNB returns to a normal state from the energy-saving state.

Energy-saving actions include: disabling/enabling a cell; disabling/enabling a carrier; disabling/enabling a transceiver; disabling/enabling a Home eNB (HeNB) and others.

FIG. 1 is a structure diagram of a network of heterogeneous systems where a Long Term Evolution (LTE) system and an Advanced LTE (LTE-A) system coexist, a User Equipment (UE), a radio access network and a Core Network (CN) constitute the architecture of the entire network of heterogeneous systems, and the UE supports communication with an eNB via an LTE-Uu interface, communication with a Node B via a UMTS (Universal Mobile Telecommunications System) Terrestrial Radio Access Network (UTRAN)-Uu interface and communication with a Base Transceiver Station (BTS) via a GSM (Global System for Mobile Communications) EDGE (Enhanced Data Rate for GSM Evolution) Radio Access Network (GERAN)-Um interface.

The eNB accesses a Mobility Management Entity (MME) in the CN via an S1 interface, the Node B communicates with a Radio Network Controller (RNC) via an Iub interface, the BTS communicates with a Base Station Controller (BSC) via an Abis interface, the RNC is connected to the BSC via an Iur-g interface, and the RNC and the BSC access a Serving GPRS Support Node (SGSN) in the CN respectively via Iu interfaces. The SGSN and the MME in the CN perform interaction of an ESM control message.

At present, energy saving is performed by using the distributed architecture in the LTE system, that is, a basic base station with a wide coverage area decides whether to activate an energy-saving cell in the coverage area of the basic base station according to current load condition, and the energy-saving cell can disable a transmitter by itself to enter into an energy-saving state when its load is very low.

For a cell with three sectors, for example, there are four transceivers in each sector, and devices at the Radio Access Network (RAN) side are intended for a demand during peak hours, so twelve transceivers stay in an activation state all the time, but this may not be required during low-service hours (e.g., a midnight). Thus an energy source control mechanism is introduced, where each sector is provided with a transceiver capable of covering the sector, and a service demand can be satisfied so long as this transceiver is kept in a standby state during low-service hours. If this energy-saving strategy is applicable to all the eNBs, considerable energy sources can be saved without influencing quality of service.

However a basic base station with a large coverage area has to be deployed in the foregoing energy-saving mechanism, but a waste of resources may result from the coverage area of the basic base station being too large, while service losses of other energy-saving cells may result from the coverage area of the basic base station being not sufficiently large after the other energy-saving cells disable transceivers in an energy-saving state.

An energy saving compensation technology used to compensate service losses of energy-saving cells is absent in the existing LTE energy-saving solution, and the existing distributed architecture can not be applied to different application scenarios flexibly.

SUMMARY OF THE INVENTION

Embodiments of the invention provide a method and base station for energy saving compensation so as to optimize the existing energy-saving mechanism and provide a solution capable of compensating service losses of an energy-saving cell.

The invention provides a method for energy saving compensation, which includes:

expanding, by a base station, a signal coverage area to form a new cell when an energy saving activation requirement is satisfied so that an energy-saving cell managed by the base station switches users to the new cell and activates an energy-saving state; and switching, by the base station, the users to the energy-saving cell and reducing the signal coverage area if the energy-saving cell managed by the base station deactivates the energy-saving state when an energy saving deactivation requirement is satisfied.

The invention further provides a base station for performing energy saving compensation operations, which includes:

an energy saving compensation unit configured to expand a signal coverage area of the base station to form a new cell when an energy saving activation requirement is satisfied so that an energy-saving cell managed by the base station can switch users to the new cell and activate an energy-saving state; and an energy saving de-compensation unit configured to switch the users to the energy-saving cell and to reduce the signal coverage area of the base station when an energy saving deactivation requirement is satisfied and the energy-saving cell managed by the base station deactivates the energy-saving state.

The following advantageous effects can be obtained by using the method and base station for energy saving compensation according to the invention: when some energy-saving cells are in an energy-saving state, other cells can provide compensation operations in order to guarantee service or coverage continuity, and the energy-saving cells can quit energy saving compensation in the case of heavy service to thereby ensure normal service operation of the cells providing the compensation operations.

DETAILED DESCRIPTION OF THE EMBODIMENTS

The method and base station for energy saving compensation according to the invention will be described below in details with reference to the drawings and embodiments.

A basic base station with a large coverage area has to be deployed in the existing energy-saving mechanism, but a waste of resources may result from the coverage area of the basic base station being too large, while service losses of other energy-saving cells may result from the coverage area of the basic base station being not sufficiently large after the other energy-saving cells disable transceivers in an energy-saving state. In view of this, a method for energy saving compensation provided in the invention includes: when an energy saving activation requirement is satisfied, a base station expands a signal coverage area to form a new cell, and an energy-saving cell managed by the base station switches users to the new cell and activates an energy-saving state; and when an energy saving deactivation requirement is satisfied, the energy-saving cell managed by the base station deactivates the energy-saving state, and the base station switches the users to the energy-saving cell and reduces the signal coverage area.

In the foregoing method for energy saving compensation provided in the invention, when a network element enters into an ESM state, network elements around in normal operation will enter into an energy saving compensation activation state and compensate energy-saving service losses of the ESM cell by expanding a signal coverage area or the like.

The method of compensation operations provided in the invention is an important link of energy-saving technologies and adopts different strategies in different scenarios to improve the existing energy-saving technologies. When some energy-saving cells are in the energy-saving state, other cells shall provide compensation operations in order to guarantee service or coverage continuity, and this operation mode can be performed automatically by a network device or can be controlled centrally by the OAM. A compensation mode can be an omni-directional or directional expansion mode. Different energy-saving strategies and parameter configurations are adopted in the different modes. Methods of compensation operations applicable to different application scenarios will be given below.

Figure 1:
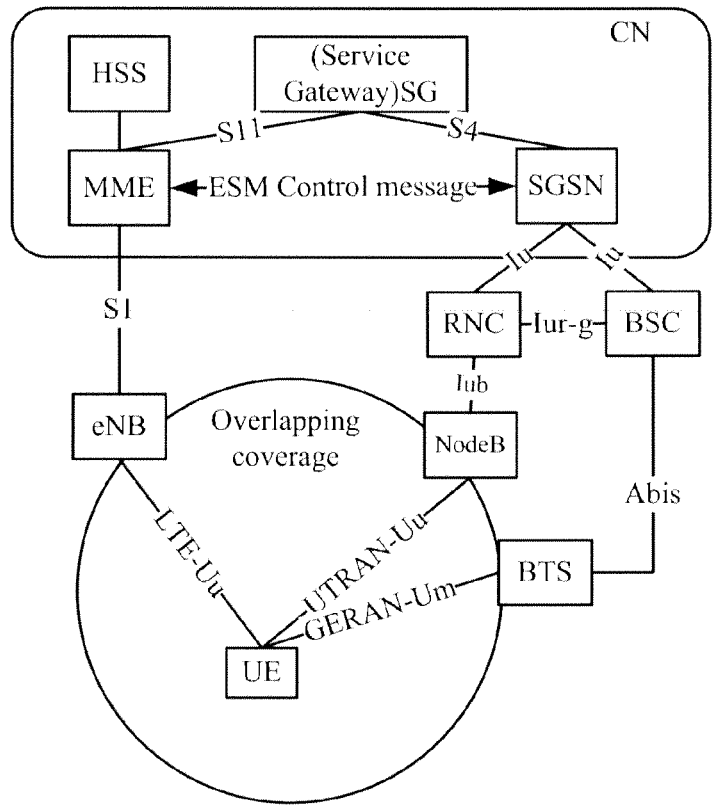
FIG. 1 is a structure diagram of the existing network of heterogeneous systems.
Figure 2:
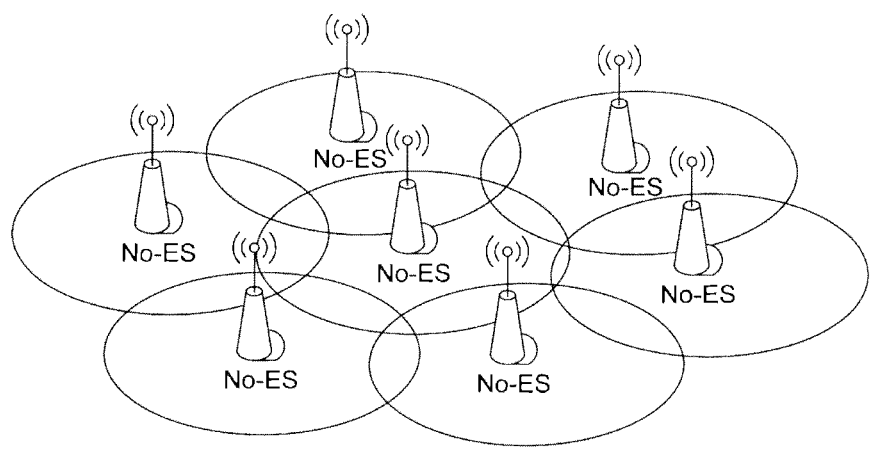
FIG. 2 is a schematic diagram of a coverage base station which doesn't enter into an energy saving compensation state according to an embodiment of the invention.
Figure 3:
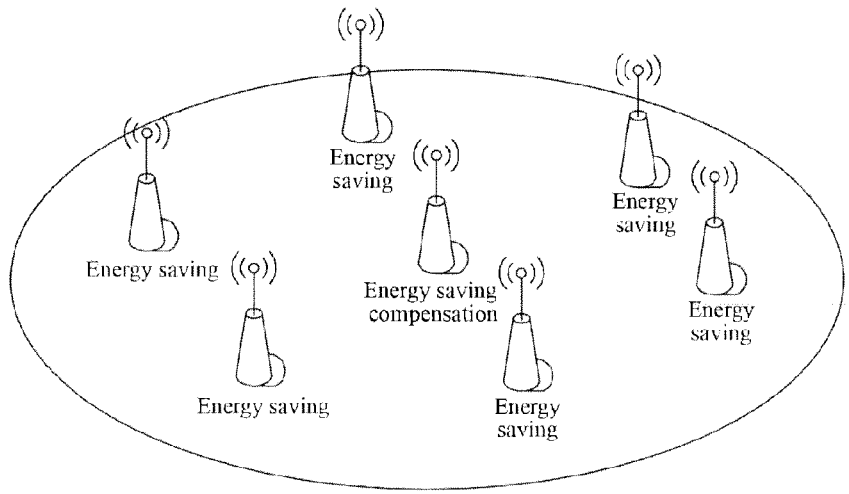
FIG. 3 is a schematic diagram of a coverage base station which enter into an energy saving compensation state according to an embodiment of the invention.

In a method for energy saving compensation according to a first preferred embodiment of the invention, energy saving compensation can be performed in such a mode that a network device performs compensation operations automatically, so this method is applicable to an application scenario with a greatly and regularly varying service load, for example a stadium or a centralized office area. As illustrated in FIG. 2, corresponding to operating states of respective base stations during service peak hours, the respective base stations are in an energy saving deactivation state, and the base stations corresponding to energy-saving cells each transmits signals. As illustrated in FIG. 3, corresponding to operating of respective base stations during low-service hours, the base stations configured with an energy-saving cell management function expands a signal coverage area, and the base stations corresponding to energy-saving cells disable signal transmission to thereby make the energy-saving cells activate an energy-saving state.

Figure 4:
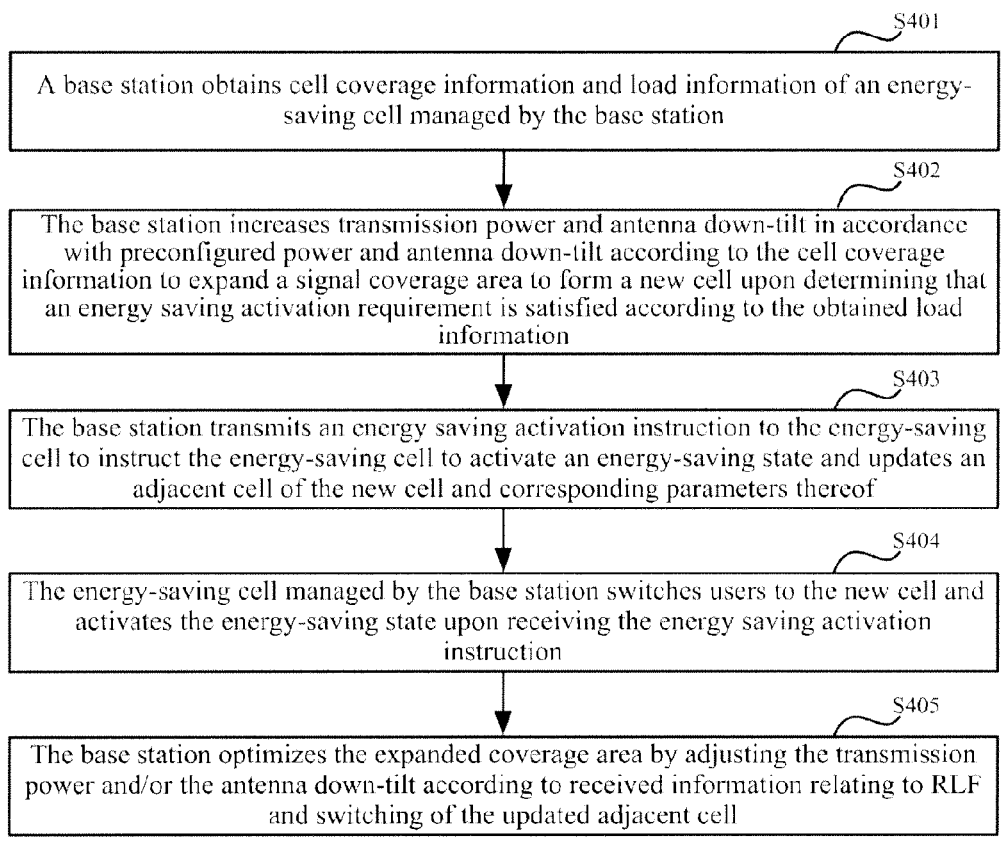
FIG. 4 is a flow chart of activating energy saving compensation according to a first preferred embodiment of the invention.

As illustrated in FIG. 4, the method for energy saving compensation in this embodiment includes:

Step 401. A base station obtains cell coverage information and load information of an energy-saving cell managed by the base station;

In this embodiment, the base station with a function to manage an energy-saving cell is configured by the OAM and typically configured on an intermediate entity of a centralized area, and a coverage base station as referred below to in this embodiment is the base station with the energy-saving cell management function. Unlike the prior art, it is not necessary for the coverage base station in this embodiment to keep signal transmission at high power all the time. The energy-saving cell managed by the base station is also configured by the OAM.

In this embodiment, the base station can obtain the cell coverage information and the load information of the energy-saving cell managed by the base station as follows:

The base station can obtain the cell coverage information of the energy-saving cell managed by the base station from the OAM or can obtain the cell coverage information of the energy-saving cell via an X2 interface to an adjacent base station, and particularly the adjacent base station corresponds to the foregoing energy-saving cell. The cell coverage information can particularly include a service coverage area or equivalent similar information, e.g., a cell type, a cell size, etc.

The base station obtains the load information of the energy-saving cell via the X2 interface to the adjacent base station, and particularly a frequency at which the load information is sampled can be set. Thus the base station can obtain the real-time load information of the energy-saving cell.

Step S402. The base station increases transmission power and antenna down-tilt in accordance with preconfigured power and antenna down-tilt according to the cell coverage information to expand a signal coverage area to form a new cell upon determining that an energy saving activation requirement is satisfied according to the obtained load information;

In this embodiment, the base station decides whether to enter into an energy saving compensation state according to the obtained load information under a specific strategy, which can be preconfigured on the base station by the OAM.

Step S403. The base station transmits an energy saving activation instruction to the energy-saving cell to instruct the energy-saving cell to activate an energy-saving state; and preferably the step further includes: the base station updates an adjacent cell of the new cell and corresponding parameters thereof;

Since the base station expands the original signal coverage area to form the new cell upon determining that the energy saving activation requirement is satisfied, a cell around the new cell is changed, and thus it is necessary to update the adjacent cell of the new cell and corresponding parameters thereof. The process of updating the adjacent cell is particularly the process in the prior art and will not be detailed here.

Step S404. The energy-saving cell managed by the base station switches users to the new cell and activates the energy-saving state upon receiving the energy saving activation instruction.

In this embodiment, the base station communicates with the energy-saving cell, particularly with the base station corresponding to the energy-saving cell, and the base station corresponding to the energy-saving cell disables or limits resources used by the energy-saving cell to make the energy-saving cell enter into the energy-saving state upon receiving the energy saving activation instruction transmitted from the coverage base station. For example, the base station corresponding to the energy-saving cell disables transmission of signals to the users, which is equivalent to disable the energy-saving cell, and it is thus necessary to switch the users in the energy-saving cell to the above new cell with a signal coverage area to thereby make the users communicate with the coverage base station.

In this embodiment, the energy-saving cell can transmit a response message after accomplishing switching the user to notify the base station of a response made by the energy-saving cell upon receiving the energy saving activation instruction.

Step S405. The base station optimizes the expanded coverage area by adjusting the transmission power and/or the antenna down-tilt according to received information relating to Radio Link Failure (RLF) and switching of the updated adjacent cell.

The coverage area expanded by the base station in accordance with the configured power and antenna down-tilt may not necessarily be an optimum coverage area, and it is thus necessary to further optimize the expanded coverage area according to the information relating to RLF and switching of the new adjacent cell after the coverage area is expanded.

In the step S402 of this embodiment, the energy-saving strategies enforced by the base station can include the following two strategies:

1) Directional Expansion Scheme

The base station determines the energy-saving cell satisfying the energy saving activation requirement according to the obtained load information in combination with a local setting, for example, determines that an energy-saving cell with a low load satisfies the energy saving activation requirement according to collected real-time load information of respective energy-saving cells; and the local setting here refers to a parameter setting and a communication mode of the coverage base station itself and also includes load information of the coverage base station itself, etc.

The base station increases the transmission power and the antenna down-tilt in accordance with the preconfigured power and antenna down-tilt according to the cell coverage information of the energy-saving cell satisfying the energy saving activation requirement to expand the signal coverage area to form the new cell so that the new cell can mainly coverage the above energy-saving cell satisfying the energy saving activation requirement, and thus this is referred to a directional expansion of transmission signals;

The base station transmits the energy saving activation instruction to the energy-saving cell, and particularly transmits the energy saving activation instruction to the energy-saving cell satisfying the energy saving activation requirement. That is, the base station performs energy saving activation only on those energy-saving cells satisfying the energy saving activation requirement but can not perform energy saving activation on other cells.

The directional expansion scheme may influence a part of the energy-saving cells or may influence all the energy-saving cells managed by the base station.

2) Omni-Directional Expansion Scheme

The base station determines a first energy saving activation period of time according to the time variation regularity of the load information of the energy-saving cell managed by the base station, that is, determines a period of time applicable to energy saving compensation according to the load information of the energy-saving cell collected by the base station in a period of time;

The base station determines that the energy saving activation requirement is satisfied when a starting time of the first energy saving activation period of time is achieved;

The base station increases the transmission power and the antenna down-tilt in accordance with the preconfigured power and omni-directional angle upon determining that the energy saving activation requirement is satisfied to expand the signal coverage area to form the new cell, and the base station uniformly covers all the energy-saving cells omni-directionally;

The base station transmits the energy saving activation instruction to the energy-saving cell, and particularly transmits the energy saving activation instruction to all the energy-saving cells managed by the base station.

In the omni-direction expansion scheme, the base station performs uniform energy-saving operations on all the energy-saving cells managed by the base station.

Of course, the ways that the base station enforces energy-saving strategies will not be limited to the foregoing two implementations but can relate to other energy-saving strategies without departing from the protection scope of the invention.

In order to make the coverage base station transmit the energy saving activation instruction to instruct the energy-saving cell to activate the energy-saving state, a signaling procedure of a cell deactivation request is added at the X2 interface in this embodiment so that the energy-saving cell activates the energy-saving state after receiving the deactivation request and returns a result to the coverage base station via a deactivation response, and messages of the deactivation request and the deactivation response are in the formats as depicted in Table 1 and Table 2.

TABLE 1

Deactivation Request

| IE/Group Name | Range of values | Description |
| --- | --- | --- |
| Message type | | |
| List of deactivated cells | 1 to maxCellineNB | Indicate cells required to enter into energy-saving state |
| >Energy-saving cell identification ECGI | | |

TABLE 2

Deactivation Response

| IE/Group Name | Range of values | Description |
| --- | --- | --- |
| Message type | | |
| Cells receiving cell deactivation request | 1 to maxCellineNB | List cells receiving command |
| >Cell identification ECGI | | |
| Criticality Diagnostics | | |

Furthermore, in an Inter-RAT scenario, i.e., the heterogeneous-system architecture, the base station transmits an energy-saving message to a MME via an S1 interface to the MME, and the MME transmits the energy saving activation instruction to the energy-saving cell according to the energy-saving message, where the energy-saving message is in the format as depicted in Table 3:

TABLE 3

Energy-Saving Message

| IE/Group Name | Presence | Range | IE Type and Reference | Semantics Description |
| --- | --- | --- | --- | --- |
| CHOICE Energy saving Application | M | | | |
| >List of deactivated cells | | | | |
| >>Cell identification ECGI | M | | | |

Figure 5:
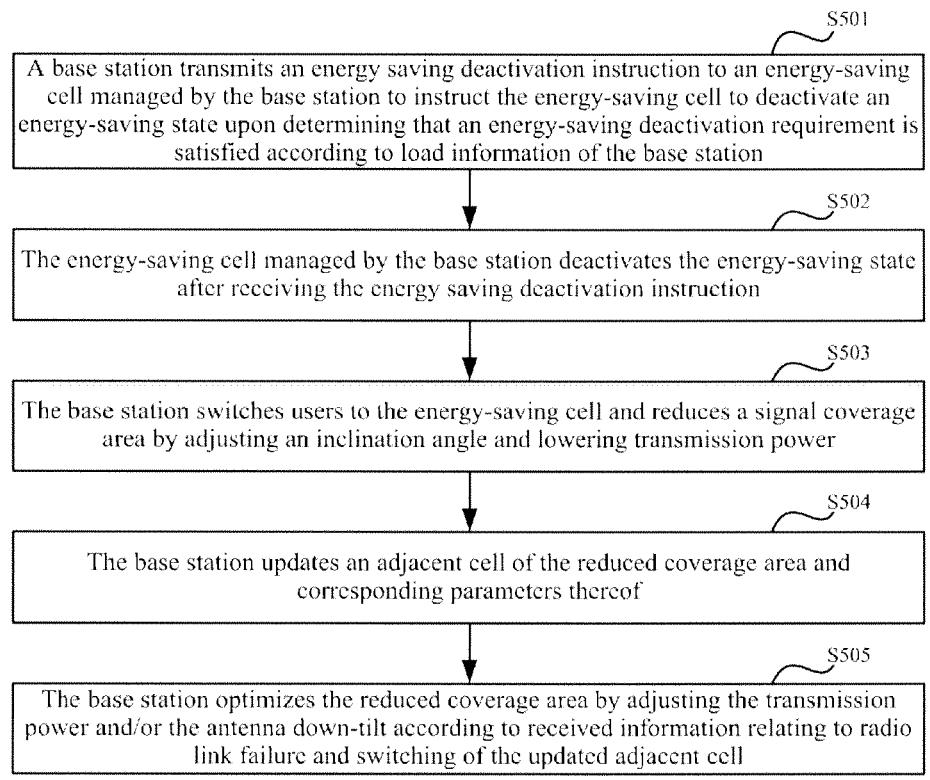
FIG. 5 is a flow chart of deactivating energy saving compensation according to the first preferred embodiment of the invention.

The following description will be given that the energy-saving state will be deactivated when the service load of the coverage base station providing compensation operations is increasing significantly after the base station expands the coverage area and enters into the energy saving compensation state in this embodiment, and as illustrated in FIG. 5, a deactivation flow is performed under the control of the base station as follows:

Step S501. The base station transmits an energy saving deactivation instruction to the energy-saving cell managed by the base station to instruct the energy-saving cell to deactivate the energy-saving state upon determining that an energy saving deactivation requirement is satisfied according to load information of the base station;

The load of the coverage base station will be significantly increased during service peak hours due to the switching from the energy-saving cell to the new cell, and thus the coverage base station can decide whether to deactivate energy saving compensation according to its own load condition.

Step 502. The energy-saving cell managed by the base station deactivates the energy-saving state after receiving the energy saving deactivation instruction;

Specifically, the base station transmits a cell activation request via an S1 interface or via an X2 interface to an adjacent base station. The energy-saving cell receiving the cell activation request deactivates the energy-saving state and returns a cell activation response to the base station.

Specifically, the coverage base station communicates with the energy-saving cell and with a base station corresponding to the energy-saving cell, and such the base station deactivates the energy-saving state by resuming resources of the energy-saving cell, for example, enabling a transmitter. Of course, such the base station further keeps communication with the coverage base station when the energy-saving cell is in the energy-saving state.

Step S503. The base station switches the users to the energy-saving cell and reduces the signal coverage area by adjusting an antenna down-tilt and lowering transmission power.

Since the resources of the energy-saving cell have been resumed, the coverage base station will not supplement the service of the energy-saving cell any more and resume the original coverage area in order to satisfy a current high load requirement.

Step S504. The base station updates an adjacent cell of the reduced coverage area and corresponding parameters thereof;

Since the coverage area is reduced, a cell around is changed and the base station updates the adjacent cell of the reduced coverage area and corresponding parameters thereof after reducing the coverage area.

Step S505. The base station optimizes the reduced coverage area by adjusting the transmission power and/or the antenna down-tilt according to received information relating to radio link failure and switching of the updated adjacent cell.

For an optimum coverage area, the base station optimizes the reduced coverage area according to the information relating to the TLR and the switching of the updated adjacent cell.

In another implementation of the invention, the base station and the energy-saving cell managed by the base station are controlled centrally by OAM to perform energy-saving operations in the provided method for energy saving compensation, and this method is applicable to a highly regular scenario, e.g., a residential area, etc. Under an energy-saving strategy here, respective cells operate in accordance with specific time regularity, for example, enable the energy-saving state during working hours in the daytime and can resume the normal state during off-work hours at night.

Figure 6:
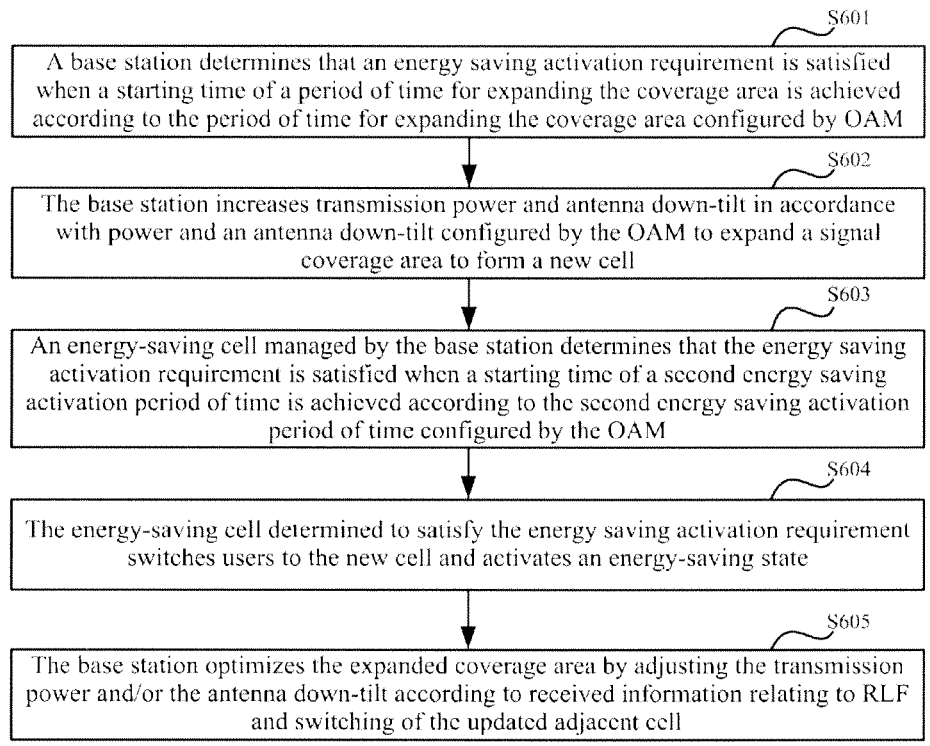
FIG. 6 is a flow chart of activating energy saving compensation according to a second preferred embodiment of the invention.

As illustrated in FIG. 6, a method for energy saving compensation operations in this embodiment includes:

Step S601. A base station determines that an energy saving activation requirement is satisfied when a starting time of a period of time for expanding the coverage area is achieved according to the period of time for expanding the coverage area configured by the OAM;

That is, the time when the base station starts to perform energy-saving compensation operations is well configured by the OAM instead of being determined by the base station.

Step S602. The base station increases transmission power and antenna down-tilt in accordance with power and an antenna down-tilt configured by the OAM to expand a signal coverage area to form a new cell;

The way how the base station expands the coverage area is also well configured by the OAM.

In this embodiment, the OAM configures well at the coverage base station the time when the coverage base station starts energy saving compensation upon determining a period of time for performing energy saving compensation operations according to an energy-saving strategy, and thus the coverage base station playing a coverage role firstly enters into a compensation operation mode, that is, increases gradually the transmission power and the antenna down-tilt in accordance with the preconfigured power and antenna down-tilt to expand the coverage area.

The OAM configures an energy-saving cell, playing an energy-saving role, managed by the base station to subsequently enter into an energy-saving ready state, where, for example, the signal coverage area is expanded to form a new cell and some parameters are updated for the communication with users under the coverage of the new cell.

Step S603. The energy-saving cell managed by the base station determines that the energy saving activation requirement is satisfied when a starting time of a second energy saving activation period of time is achieved according to the second energy saving activation period of time configured by the OAM;

That is, the time when the energy-saving cell managed by the base station starts to perform energy saving activation is also well configured by the OAM.

Step S604. The energy-saving cell determined to satisfy the energy saving activation requirement switches the users to the new cell and activates an energy-saving state;

This step is a cell switching procedure which is particularly a procedure in the prior art and will not be detailed here.

In an embodiment of the invention, after the base station expands the signal coverage area, the process further includes a step S605 in which the base station updates an adjacent cell of the new cell formed after the signal coverage area is expanded and corresponding parameters thereof.

Step S605. The base station optimizes the expanded coverage area by adjusting the transmission power and/or the antenna down-tilt according to received information relating to RLF and switching of the updated adjacent cell.

Under the energy-saving strategy of being controlled centrally by the OAM, no signaling interaction is required between the base station and the energy-saving cell, both of which respectively start to perform the corresponding actions according to the corresponding times configured by the OAM, and preferably, the OAM configures the starting times of the respective periods of time in the foregoing steps.

In this embodiment, the OAM further configures roles of respective cells, and particularly configures the coverage base station and the energy-saving cell managed by the coverage base station, and may also pre-configure possible compensation power and other information of the cell playing the coverage role.

Figure 7:
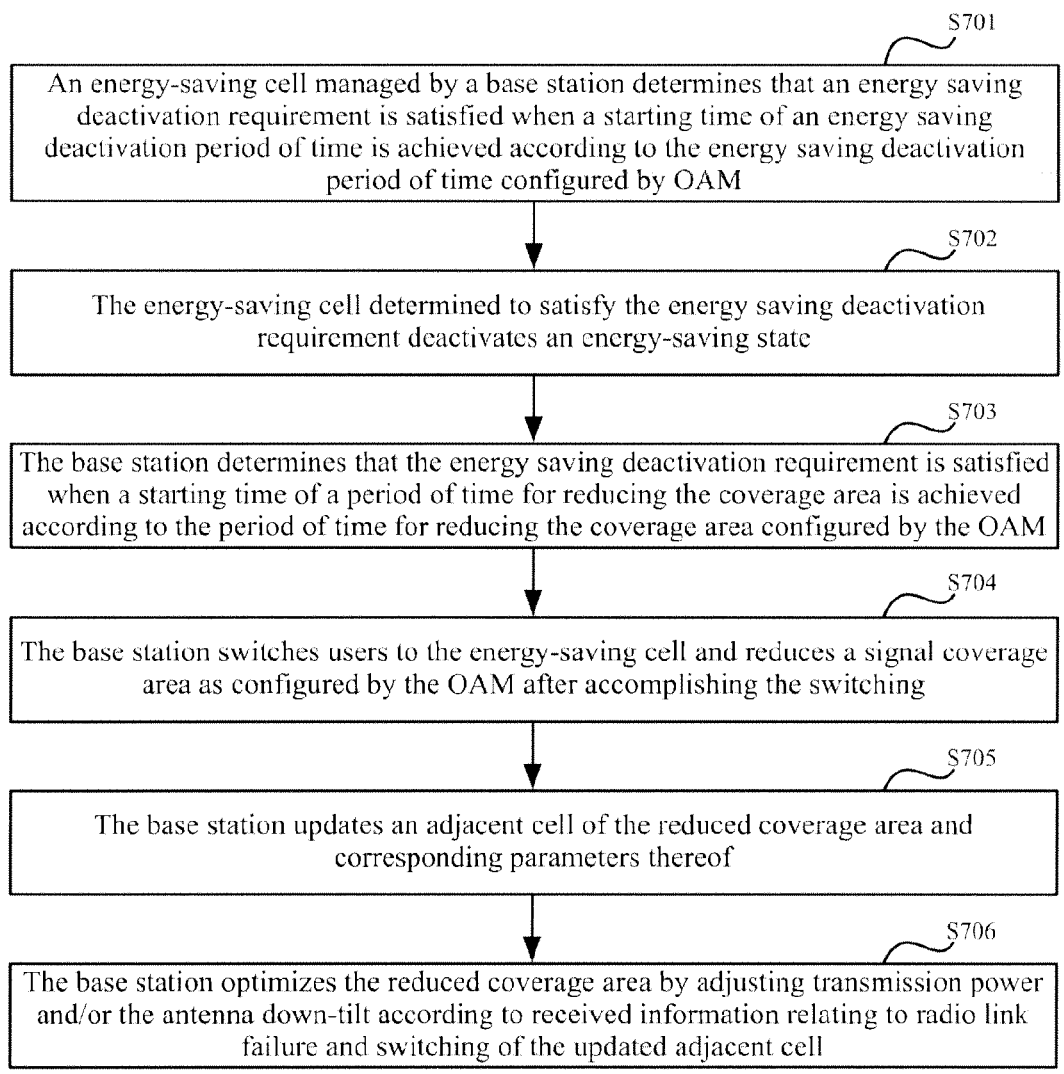
FIG. 7 is a flow chart of deactivating energy saving compensation according to the second preferred embodiment of the invention.

Energy saving compensation quit operations are also configured under the energy-saving strategy of being controlled centrally by the OAM, and as illustrated in FIG. 7, a corresponding compensation state quit flow is as follows:

Step S701. An energy-saving cell managed by a base station determines that an energy saving deactivation requirement is satisfied when a starting time of an energy saving deactivation period of time is achieved according to the energy saving deactivation period of time configured by the OAM;

Step S702. The energy-saving cell determined to satisfy the energy saving deactivation requirement deactivates an energy-saving state;

Subsequently the coverage base station playing the coverage role enters into an energy saving compensation deactivation ready state. For example, the base station corresponding to the energy-saving cell, after starting to transmit signals, covers the energy-saving cell and updates some parameters of the energy-saving cell for the communication with users in the energy-saving cell.

Step S703. The base station determines that the energy saving deactivation requirement is satisfied when a starting time of a period of time for reducing the coverage area is achieved according to the period of time for reducing the coverage area configured by the OAM;

Step S704. The base station switches users to the energy-saving cell and reduces the signal coverage area as configured by the OAM after accomplishing the switching;

Step S705. The base station updates an adjacent cell of the reduced coverage area and corresponding parameters thereof;

Step S706. The base station optimizes the reduced coverage area by adjusting transmission power and/or the antenna down-tilt according to received information relating to radio link failure and switching of the updated adjacent cell.

In the above method for energy saving compensation according to the invention, when some energy-saving cells are in the energy-saving state, other cells shall provide compensation operations in order to guarantee service or coverage continuity, and this operation mode can be performed automatically by the network device or can be controlled centrally by the OAM. A compensation mode can be an omni-directional or directional expansion mode. Different energy-saving strategies and parameter configurations are adopted in the different modes.

In the first preferred embodiment of the invention, the coverage base station shall perform the following several steps of: collecting cell load information of a relevant energy-saving cell, obtaining a coverage area and other information of the energy-saving cell and deciding under a preset strategy to enter into an energy saving compensation state; increasing transmission power and antenna down-tilt gradually in accordance with preconfigured power and antenna down-tilt to expand the coverage area; transmitting an energy saving activation instruction to the relevant energy-saving cell via an S1/X2 interface; collecting information relating to RLF and switching from an adjacent cell and accordingly adjusting the transmission power and/or the antenna down-tilt, etc., to optimize the expanded coverage area; deciding to quit the energy saving compensation state according to a current load; transmitting an energy saving deactivation instruction to the relevant energy-saving cell via the S1/X2 interface; switching UEs to the energy-saving cell; gradually lowering the transmission power and adjusting the antenna down-tilt to reduce the coverage area; and collecting information relating to RLF and switching from the adjacent cell and accordingly adjusting the transmission power and/or the antenna down-tilt, etc., to optimize the reduced coverage area.

The OAM device shall configure the energy-saving role of each cell and the attribute of the energy-saving cell to the coverage base station of the coverage cell and configure the energy-saving strategy, a load threshold, etc., to the coverage base station.

The base station device corresponding to the energy-saving cell shall perform the following several steps of: receiving the energy saving activation instruction from the coverage cell via the S1/X2 interface and performing energy-saving operations; starting to switch the users to the new cell formed after the area is expanded; and receiving the energy saving deactivation instruction from the coverage cell via the S1/X2 interface and performing power transmission to thereby deactivate the energy-saving state.

In the second preferred embodiment of the invention, the coverage base station shall perform the following several steps of: deciding under a strategy preconfigured by the OAM to enter into an energy saving compensation state; increasing transmission power and antenna down-tilt gradually in accordance with preconfigured power and antenna down-tilt to expand a coverage area; updating a relationship with an adjacent cell, corresponding parameters, etc., and collecting information relating to RLF and switching from a new adjacent cell and accordingly adjusting the transmission power and/or the antenna down-tilt, etc., to optimize the expanded coverage area; entering into an energy saving compensation deactivation ready state under a strategy preconfigured by the OAM; starting to switch users to a cell quitting the energy-saving state; gradually lowering the transmission power and adjusting the antenna down-tilt to reduce its own coverage area; and collecting information relating to RLF and switching from the adjacent cell and accordingly adjusting the transmission power and/or the antenna down-tilt, etc., to optimize the reduced coverage area.

In this embodiment, the base station device corresponding to the energy-saving cell shall perform the following several steps of: acting as a cell playing a energy-saving role and entering into an energy-saving ready state under a strategy preconfigured by the OAM; starting to switch the users to a new cell formed after the coverage base station expands the coverage area; disabling a transmitter or performing other energy-saving operations under a local strategy after accomplishing the switching; deciding to deactivate the energy saving compensation state under a pre-configured strategy, that is, enabling the transmitter and transmitting at preconfigured power and antenna down-tilt.

In this embodiment, the OAM device configures the coverage base station and the base station device corresponding to the energy-saving cell respectively, primarily by configuring roles of respective cells, generally including configuring the coverage base station corresponding to the coverage cell and configuring the energy-saving cell; and by configuring energy-saving strategies to the respective cells.

Figure 8:
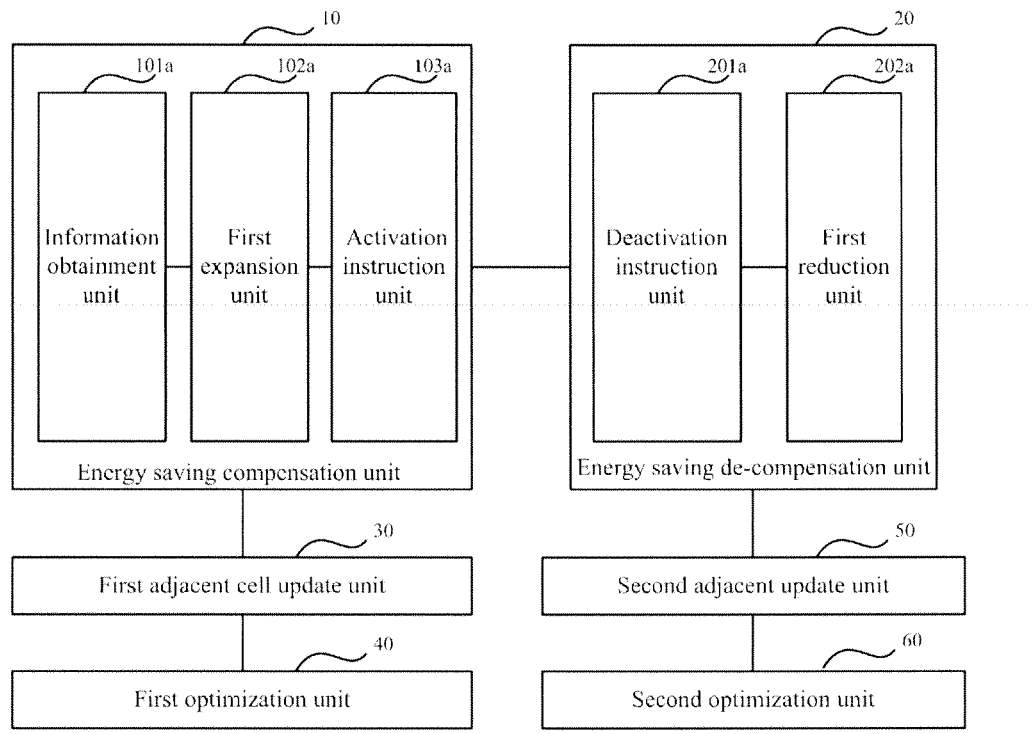
FIG. 8 is a structure diagram of a first preferred embodiment of a base station according to the invention.

In an embodiment of the invention, a base station for performing energy saving compensation operations is provided, and as illustrated in FIG. 8, the base station includes: an energy saving compensation unit 10 configured to expand a signal coverage area of the base station to form a new cell when an energy saving activation requirement is satisfied so that an energy-saving cell managed by the base station can switch users to the new cell and activate an energy-saving state; and an energy saving de-compensation unit 20 configured to switch the users to the energy-saving cell and to reduce the signal coverage area of the base station when an energy saving deactivation requirement is satisfied and the energy-saving cell managed by the base station deactivates the energy-saving state.

In a first preferred embodiment of the base station according to the invention, the energy saving compensation unit 10 includes: an information obtainment unit 101a configured to obtain cell coverage information and load information of the energy-saving cell managed by the base station; a first expansion unit 102a configured to increasing transmission power and antenna down-tilt in accordance with preconfigured power and antenna down-tilt according to the cell coverage information to expand the signal coverage area of the base station to form the new cell upon determining that the energy saving activation requirement is satisfied according to the obtained load information; and an activation instruction unit 103a configured to transmit an energy saving activation instruction to the energy-saving cell to instruct the energy-saving cell to switch the users to the new cell and to activate the energy-saving state.

Preferably, the information obtainment unit 101a is configured to obtain the cell coverage information of the energy-saving cell from OAM or via an interface between the base station and an adjacent base station and to obtain the load information of the energy-saving cell via the interface between the base station and the adjacent base station.

Preferably, the first expansion unit 102a particularly includes: an energy-saving cell determination unit configured to determine the energy-saving cell satisfying the energy saving activation requirement according to the obtained load information in combination with a local setting; and a partial coverage unit configured to increase the transmission power and the antenna down-tilt in accordance with the preconfigured power and antenna down-tilt according to the cell coverage information of the energy-saving cell satisfying the energy saving activation requirement to expand the signal coverage area of the base station to form the new cell; and the activation instruction unit is particularly configured to transmit the energy saving activation instruction to the energy-saving cell satisfying the energy saving activation requirement.

Alternatively, the first expansion unit 102a particularly includes: a first period of time determination unit configured to determine a first energy saving activation period of time according to the time variation regularity of the load information of the energy-saving cell managed by the base station; a first requirement satisfaction determination unit configured to determine that the energy saving activation requirement is satisfied when a starting time of the first energy saving activation period of time is achieved; and an omni-directional coverage unit configured to increase the transmission power and the antenna down-tilt in accordance with the preconfigured power and omni-directional angle according to the cell coverage information of all the energy-saving cells to expand the signal coverage area of the base station to form the new cell; and the activation instruction unit is particularly configured to transmit the energy saving activation instruction to all the energy-saving cells managed by the base station.

Preferably, the energy saving de-compensation unit 20 includes: a deactivation instruction unit 201a configured to transmit an energy saving deactivation instruction to the energy-saving cell managed by the base station to instruct the energy-saving cell to deactivate the energy-saving state upon determining that the energy saving deactivation requirement is satisfied according to load information of the base station; and a first reduction unit 202a configured to switch the users to the energy-saving cell and to reduce the signal coverage area of the base station by adjusting the antenna down-tilt and lowering the transmission power after the energy-saving cell deactivates the energy-saving state.

Figure 9:
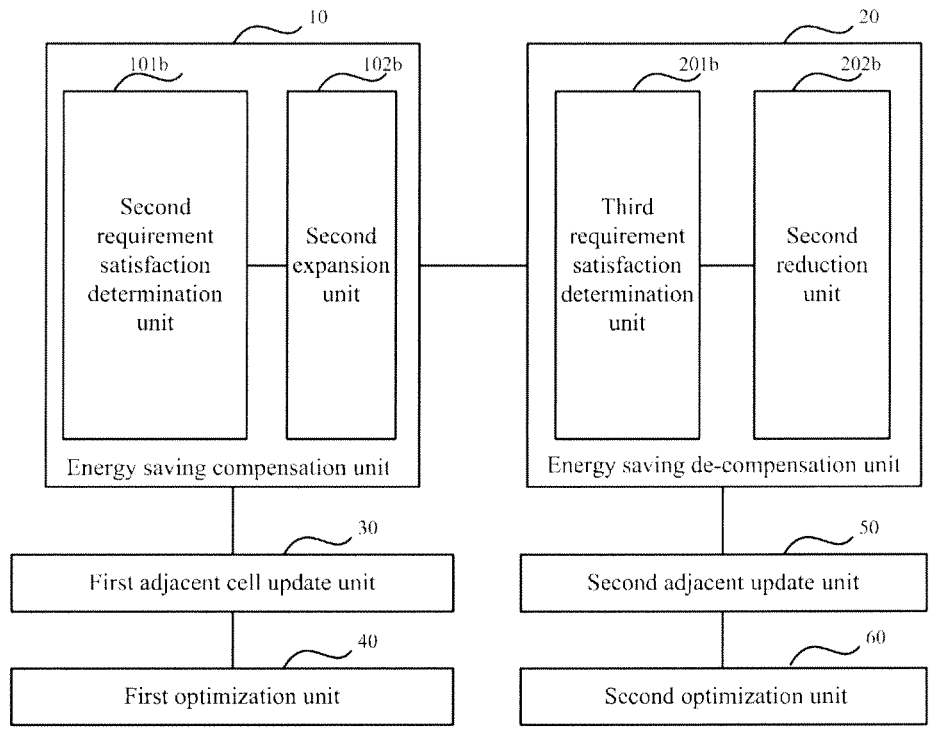
FIG. 9 is a structure diagram of a second preferred embodiment of a base station according to the invention.

In a second preferred embodiment of the base station according to the invention, as illustrated in FIG. 9, the energy saving compensation unit 10 includes: a second requirement satisfaction determination unit 101b configured to determine that the energy saving activation requirement is satisfied when a starting time of a period of time for expanding the coverage area is achieved according to the period of time for expanding the coverage area configured by OAM; and a second expansion unit 102b configured to increase the transmission power and the antenna down-tilt in accordance with the power and the antenna down-tilt configured by the OAM to expand the signal coverage area of the base station to form the new cell so that the energy-saving cell managed by the base station can switch the users to the new cell and activate the energy-saving state.

Preferably, the energy saving de-compensation unit 20 includes: a third requirement satisfaction determination unit 201b configured to determine that the energy saving deactivation requirement is satisfied when a starting time of a period of time for reducing the coverage area is achieved according to the period of time for reducing the coverage area configured by the OAM; and a second reduction unit 202b configured to switch the users to the energy-saving cell and to reduce the signal coverage area as configured by the OAM after accomplishing the switching.

Preferably, as illustrated in FIG. 8 and FIG. 9, the base station further includes: a first adjacent cell update unit 30 configured to update an adjacent cell of the new cell and corresponding parameters thereof after the signal coverage area of the base station is expanded to form the new cell; a first optimization unit 40 configured to optimize the expanded coverage area by adjusting the transmission power and/or the antenna down-tilt according to received information relating to radio link failure and switching of the updated adjacent cell; a second adjacent cell update unit 50 configured to update an adjacent cell of the reduced coverage area and corresponding parameters thereof after the signal coverage area is reduced; and a second optimization unit 60 configured to optimize the reduced coverage area by adjusting the transmission power and/or the antenna down-tilt according to received information relating to radio link failure and switching of the updated adjacent cell.

The foregoing solution to energy saving compensation operations provided in the invention primarily includes two mechanisms of being performed automatically by a network device and of being controlled centrally by OAM, information can be exchanged via an S1 interface, an X2 interface, etc., and different strategies can be adopted in different scenarios to thereby save the energy consumed throughout a network.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of embodiments of the invention. Thus the invention is also intended to encompass these modifications and variations thereto so long as these modifications and variations of embodiments of the invention come into the scope of the claims appended to the invention and their equivalents.

The invention claimed is:

1. A method for energy saving compensation, comprising:
    expanding, by a base station, a signal coverage area to form a new cell when an energy saving activation requirement is satisfied so that an energy-saving cell managed by the base station switches users to the new cell and activates an energy-saving state; and
    switching, by the base station, the users to the energy-saving cell and reducing the signal coverage area if the energy-saving cell managed by the base station deactivates the energy-saving state when an energy saving deactivation requirement is satisfied;
    wherein the base station expands or reduces the signal coverage area by increasing or lowering any one or combination of transmission parameters as follows:
    transmission power;

antenna down-tilt; and antenna height;

wherein expanding, by the base station, the signal coverage area to form the new cell when the energy saving activation requirement is satisfied so that the energy-saving cell managed by the base station switches the users to the new cell and activates the energy-saving state specifically comprises:

obtaining, by the base station, cell coverage information and load information of the energy-saving cell managed by the base station;

expanding, by the base station, the signal coverage area to form the new cell according to the cell coverage information and any one or combination of the transmission parameters, upon determining that the energy saving activation requirement is satisfied according to the obtained load information; and transmitting, by the base station, an energy saving activation instruction to the energy-saving cell to instruct the energy-saving cell to activate the energy-saving state so that the energy-saving cell managed by the base station switches the users to the new cell and activates the energy-saving state when receiving the energy saving activation instruction.

2. The method according to claim 1, wherein obtaining, by the base station, the cell coverage information and the load information of the energy-saving cell managed by the base station specifically comprises:

obtaining, by the base station, the cell coverage information of the energy-saving cell from Operation Administration and Maintenance, OAM, or via an interface to an adjacent base station; and obtaining, by the base station, the load information of the energy-saving cell via the interface to the adjacent base station.

3. The method according to claim 1, wherein expanding, by the base station, the signal coverage area to form the new cell according to the cell coverage information and any one or combination of the transmission parameters, upon determining that the energy saving activation requirement is satisfied according to the obtained load information specifically comprises:

determining, by the base station, the energy-saving cell satisfying the energy saving activation requirement according to the obtained load information in combination with a local setting; and expanding, by the base station, the signal coverage area to form the new cell according to the any one or combination of the transmission parameters and the cell coverage information of the energy-saving cell satisfying the energy saving activation requirement;

wherein transmitting, by the base station, the energy saving activation instruction to the energy-saving cell specifically comprises transmitting the energy saving activation instruction to the energy-saving cell satisfying the energy saving activation requirement.

4. The method according to claim 1, wherein expanding, by the base station, the signal coverage area to form the new cell according to the cell coverage information and any one or combination of the transmission parameters, upon determining that the energy saving activation requirement is satisfied according to the obtained load information specifically comprises:

determining, by the base station, a first energy saving activation period of time according to the time variation regularity of the load information of the energy-saving cell managed by the base station;

determining, by the base station, that the energy saving activation requirement is satisfied when a starting time of the first energy saving activation period of time is achieved; and expanding, by the base station, the signal coverage area to form the new cell according to the any one or combination of the transmission parameters and the cell coverage information of all the energy-saving cells;

wherein transmitting, by the base station, the energy saving activation instruction to the energy-saving cell specifically comprises transmitting the energy saving activation instruction to all the energy-saving cells managed by the base station.

5. The method according to claim 1, wherein switching, by the base station, the users to the energy-saving cell and reducing the signal coverage area if the energy-saving cell managed by the base station deactivates the energy-saving state when the energy saving deactivation requirement is satisfied specifically comprises:

transmitting, by the base station, an energy saving deactivation instruction to the energy-saving cell managed by the base station to instruct the energy-saving cell to deactivate the energy-saving state upon determining that the energy saving deactivation requirement is satisfied according to load information of the base station; and switching, by the base station, the users to the energy-saving cell and reducing the signal coverage area after the energy-saving cell managed by the base station receives the energy saving deactivation instruction and deactivates the energy-saving state.

6. The method according to claim 1, wherein expanding, by the base station, the signal coverage area to form the new cell when the energy saving activation requirement is satisfied so that the energy-saving cell managed by the base station switches the users to the new cell and activates the energy-saving state specifically comprises:

determining, by the base station, that the energy saving activation requirement is satisfied when a starting time of a period of time for expanding the coverage area is achieved according to the period of time for expanding the coverage area configured by Operation Administration and Maintenance, OAM, and expanding the signal coverage area to form the new cell in accordance with the any one or combination of the transmission parameters configured by the OAM, so that the energy-saving cell managed by the base station determines that the energy saving activation requirement is satisfied when a starting time of a second energy saving activation period of time is achieved according to the second energy saving activation period of time configured by the OAM and the energy-saving cell satisfying the energy saving activation requirement switches the users to the new cell and activates the energy-saving state.

7. The method according to claim 6, wherein switching, by the base station, the users to the energy-saving cell and reducing the signal coverage area if the energy-saving cell managed by the base station deactivates the energy-saving state when the energy saving deactivation requirement is satisfied specifically comprises:

determining, by the base station, that the energy saving deactivation requirement is satisfied when a starting time of a period of time for reducing the coverage area is achieved according to the period of time for reducing the coverage area configured by the OAM, switching the users to the energy-saving cell and reducing the signal coverage area as configured by the OAM after accomplishing the switching, if the energy-saving cell managed by the base station determines that the energy saving deactivation requirement is satisfied when a starting time of an energy saving deactivation period of time is achieved according to the energy saving deactivation period of time configured by the OAM and the energy-saving cell satisfying the energy saving deactivation requirement deactivates the energy-saving state.

8. The method according to claim 1, wherein after the base station expands the signal coverage area to form the new cell, the method further comprises:
updating, by the base station, an adjacent cell of the new cell and corresponding parameters thereof; and
optimizing, by the base station, the expanded coverage area by adjusting the any one or combination of the transmission parameters according to received information relating to radio link failure and switching of the updated adjacent cell; and
wherein after the base station reduces the signal coverage area, the method further comprises:
updating, by the base station, an adjacent cell of the reduced coverage area and corresponding parameters thereof; and
optimizing, by the base station, the reduced coverage area by adjusting the any one or combination of the transmission parameters according to received information relating to radio link failure and switching of the updated adjacent cell.

9. The method according to claim 1, wherein transmitting, by the base station, the energy saving activation instruction to the energy-saving cell specifically comprises:
transmitting a cell deactivation request signaling via an X2 interface to an adjacent base station thereby to transmit the energy saving activation instruction to the energy-saving cell; or
transmitting an energy-saving message to a Mobility Management Entity, MME, via an S1 interface to the MME, and transmitting, by the MME, the energy saving activation instruction to the energy-saving cell according to the energy-saving message.

10. A base station for performing energy saving compensation operations, comprising:
an energy saving compensation unit configured to expand a signal coverage area of the base station to form a new cell when an energy saving activation requirement is satisfied so that an energy-saving cell managed by the base station can switch users to the new cell and activate an energy-saving state; and
an energy saving de-compensation unit configured to switch the users to the energy-saving cell and to reduce the signal coverage area of the base station when an energy saving deactivation requirement is satisfied and the energy-saving cell managed by the base station deactivates the energy-saving state;
wherein the energy saving compensation unit expands or the energy saving de-compensation unit reduces the signal coverage area by increasing or lowering any one or combination of transmission parameters as follows:
transmission power;
antenna down-tilt; and
antenna height;
wherein the energy saving compensation unit comprises:
an information obtainment unit configured to obtain cell coverage information and load information of the energy-saving cell managed by the base station;
a first expansion unit configured to expand the signal coverage area of the base station to form the new cell according to the cell coverage information and any one or combination of the transmission parameters, upon determining that the energy saving activation requirement is satisfied according to the obtained load information; and
an activation instruction unit configured to transmit an energy saving activation instruction to the energy-saving cell to instruct the energy-saving cell to switch the users to the new cell and to activate the energy-saving state.

11. The base station according to claim 10, wherein the first expansion unit specifically comprises:
an energy-saving cell determination unit configured to determine the energy-saving cell satisfying the energy saving activation requirement according to the obtained load information in combination with a local setting; and
a partial coverage unit configured to expand the signal coverage area of the base station to form the new cell according to the any one or combination of the transmission parameters and the cell coverage information of the energy-saving cell satisfying the energy saving activation requirement; and
the activation instruction unit specifically configured to transmit the energy saving activation instruction to the energy-saving cell satisfying the energy saving activation requirement.

12. The base station according to claim 10, wherein the first expansion unit specifically comprises:
a first period of time determination unit configured to determine a first energy saving activation period of time according to the time variation regularity of the load information of the energy-saving cell managed by the base station;
a first requirement satisfaction determination unit configured to determine that the energy saving activation requirement is satisfied when a starting time of the first energy saving activation period of time is achieved; and
an omni-directional coverage unit configured to expand the signal coverage area of the base station to form the new cell according to the any one or combination of the transmission parameters and the cell coverage information of all the energy-saving cells; and
the activation instruction unit specifically configured to transmit the energy saving activation instruction to all the energy-saving cells managed by the base station.

13. The base station according to claim 10, wherein the energy saving de-compensation unit specifically comprises:
a deactivation instruction unit configured to transmit an energy saving deactivation instruction to the energy-saving cell managed by the base station to instruct the energy-saving cell to deactivate the energy-saving state upon determining that the energy saving deactivation requirement is satisfied according to load information of the base station; and
a first reduction unit configured to switch the users to the energy-saving cell and to reduce the signal coverage area of the base station after the energy-saving cell deactivates the energy-saving state.

14. The base station according to claim 10, wherein the energy saving compensation unit specifically comprises:
a second requirement satisfaction determination unit configured to determine that the energy saving activation requirement is satisfied when a starting time of a period of time for expanding the coverage area is achieved according to the period of time for expanding the coverage area configured by Operation Administration and Maintenance, OAM; and a second expansion unit configured to expand the signal coverage area of the base station to form the new cell in accordance with the power the any one or combination of the transmission parameters configured by the OAM, so that the energy-saving cell managed by the base station determines that the energy saving activation requirement is satisfied when a starting time of a second energy saving activation period of time is achieved according to the second energy saving activation period of time configured by the OAM and the energy-saving cell satisfying the energy saving activation requirement switches the users to the new cell and activates the energy-saving state.

15. The base station according to claim 14, wherein the energy saving de-compensation unit specifically comprises:

a third requirement satisfaction determination unit configured to determine that the energy saving deactivation requirement is satisfied when a starting time of a period of time for reducing the coverage area is achieved according to the period of time for reducing the coverage area configured by the OAM; and a second reduction unit configured to switch the users to the energy-saving cell and to reduce the signal coverage area as configured by the OAM after accomplishing the switching.

16. The base station according to claim 10, further comprising:

a first adjacent cell update unit configured to update an adjacent cell of the new cell and corresponding parameters thereof after the signal coverage area of the base station is expanded to form the new cell;

a first optimization unit configured to optimize the expanded coverage area by adjusting the any one or combination of the transmission parameters according to received information relating to radio link failure and switching of the updated adjacent cell;

a second adjacent cell update unit configured to update an adjacent cell of the reduced coverage area and corresponding parameters thereof after the signal coverage area is reduced; and a second optimization unit configured to optimize the reduced coverage area by adjusting the any one or combination of the transmission parameters according to received information relating to radio link failure and switching of the updated adjacent cell.

* * * * *